United States Patent [19]

Dyes et al.

[11] Patent Number: 5,064,288

[45] Date of Patent: Nov. 12, 1991

[54] SCATTERED LIGHT MULTI-BRILLOUIN GYROSCOPE

[75] Inventors: William A. Dyes, Haverhill; Farhad Hakimi, Watertown, both of Mass.

[73] Assignee: The Charles Stark Draper Laboratory, Cambridge, Mass.

[21] Appl. No.: 623,588

[22] Filed: Dec. 7, 1990

[51] Int. Cl.$^5$ ............................................. G01C 19/72
[52] U.S. Cl. ...................................... 356/350; 372/6; 372/94
[58] Field of Search ..................... 356/350; 350/96.15; 372/6, 94

[56] References Cited

U.S. PATENT DOCUMENTS

| | | | |
|---|---|---|---|
| 3,941,481 | 3/1976 | Kramer | 356/350 |
| 4,107,628 | 8/1978 | Hill et al. | 356/350 |
| 4,159,178 | 6/1979 | Vali et al. | 356/350 |
| 4,530,097 | 7/1985 | Stokes et al. | 356/350 |

Primary Examiner—Samuel Turner
Attorney, Agent, or Firm—Iandiorio & Dingman

[57] ABSTRACT

A scattered light multi-Brillouin guided wave optical gyroscope includes a coherent light source; an optical waveguide responsive to the coherent light source for generating a Brillouin, inertially stationary, synchronized fringe from two counter-rotating fringes each derived from a pair of Brillouin waves separated by twice the Brillouin shift; and means for detecting relative rotation between the Brillouin stationary synchronized fringe and the waveguide.

12 Claims, 3 Drawing Sheets

_5,064,288_

SCATTERED LIGHT MULTI-BRILLOUIN GYROSCOPE

FIELD OF INVENTION

This invention relates to an optical gyroscope which uses multiple Brillouin waves to create a standing wave inertial interference pattern whose relative motion can be sensed from scattered light emanating from the side of the fiber optic element.

BACKGROUND OF INVENTION

There are a number of available optical gyroscopes. Resonant fiber optic gyroscopes (RFOGs) operate by recirculating a number of times a laser beam in each direction in a fiber optic ring. When the gyroscope is steady, the two counter-rotating beams are resonant at the same frequency. When the gyroscope moves the resonant conditions change so that each beam has a different resonant frequency. The difference between these shifted frequencies is a measure of gyroscope rotation rate. RFOGs require sophisticated electronics to measure this rotation rate which must be further processed to obtain the actual rotational angle. Drift caused by backscattering and other error sources requires further sophisticated electronic processing.

Interferometer fiber optic gyroscopes (IFOGs) also use two counter-rotating laser beams but they just circulate once in the fiber optic ring. The two beams create an interference pattern. The variation of the intensity of the fringes of the interference pattern represent the phase shift due to the movement of the gyroscope. Since the beams make only one circuit of the ring a long length of fiber optic element, a kilometer or more, is required and such elements are expensive. This system also requires sophisticated electronics to process the phase shift signal in order to obtain a measure of gyroscope rotation rate which must be further processed to obtain the rotation angle.

Ring laser gyroscopes (RLGs) also circulate two laser beams in opposite directions around a laser cavity. When the ring is stationary the beams oscillate at the same frequency. When the ring rotates the beam frequencies diverge and the difference in frequency is a function of the gyroscope rate of motion. Backscattering in RLGs causes locking problems which result in non-linear responses at low gyroscope rotation rates and must be compensated for by, for example, dithering the gyroscope and employing additional electronics to accommodate the dither. RLGs require costly, precision optics for the cavity and the mirrors to minimize backscattering and require high voltage to drive the HeNe laser source.

SUMMARY OF INVENTION

It is therefore an object of this invention to provide an improved fiber optic gyroscope which is simpler, less expensive and more reliable.

It is a further object of this invention to provide such an improved gyroscope which provides a direct readout of rotation angle.

It is a further object of this invention to provide such an improved gyroscope which obtains extremely high resolution without complex, sophisticated and expensive signal processing.

It is a further object of this invention to provide such an improved gyroscope which completely avoids the problems associated with backscattering.

It is a further object of this invention to provide such an improved gyroscope which requires only small, low-power laser sources and relatively short lengths of fiber optic elements.

The invention results from the realization that an extremely simple, reliable optical gyroscope can be made by using the inherent dynamics of the waveguide to demodulate two moving fringes each derived from a pair of Brillouin waves to create a stationary fringe or inertial standing wave whose motions relative to the waveguide can be sensed by means of the scattered light from the sides of the waveguide.

This invention features a scattered light multi-Brillouin guided wave optical gyroscope including a coherent light source and an optical waveguide. The optical wave guide is responsive to the coherent light source for generating a Brillouin inertially stationary synchronized fringe from two counter-rotating Brillouin moving fringes, each of which is in turn derived from a pair of Brillouin waves separated by twice the Brillouin shift. There are means for detecting relative rotation between the Brillouin stationary synchronized fringe and the waveguide.

In a preferred embodiment the coherent light source is a laser and may be a solid state laser. The optical waveguide may be a fiber optic element and the means for detecting may include indicia means proximate to and fixed with respect to the waveguide. The means for detecting may also include sensor means proximate to the side of the waveguide for sensing a shift in the Brillouin stationary fringe relative to the waveguide. The means for detecting may also include a plurality of sensors disposed proximate the side of the wave guide for sensing relative motion of the Brillouin stationary fringe. The sensors may extend a distance along the wave guide to monitor a plurality of fringes of the Brillouin stationary fringe, and there may be a number of sensors disposed adjacent each fringe pattern cycle along the wave guide ring. The sensors may include an array of CCDs. The means for detecting may include means for determining the magnitude of the motion of the Brillouin stationary fringe relative to the waveguide and its direction of motion.

DISCLOSURE OF PREFERRED EMBODIMENT

Other objects, features and advantages will occur to those skilled in the art from the following description of a preferred embodiment and the accompanying drawings, in which.

Figure 1:
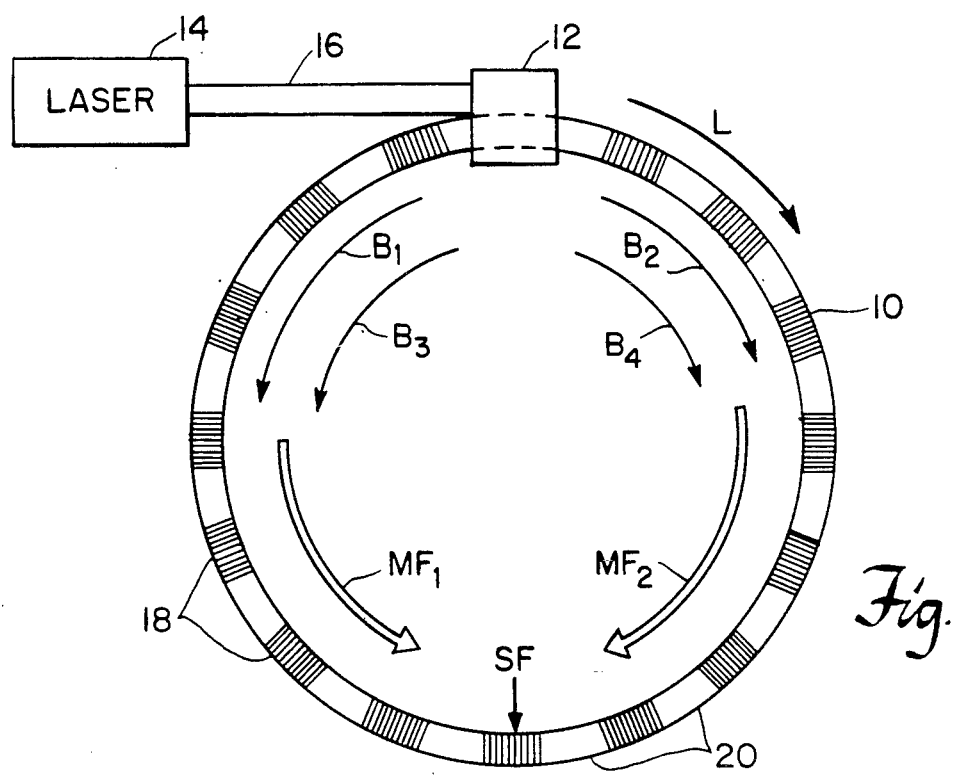
FIG. 1 is a schematic diagram of the laser driven optical waveguide in which the Brillouin waves, moving fringes and stationary fringe are created.

One of the important advantages of this invention is that it uses scattered light to detect rotation. Another is that it utilizes intrinsic non-linearity from the optical fiber together with the scattered light to bypass a great deal of electronics used in conventional optical gyros. The nonlinear property of the fiber utilized is Stimulated Brillouin Scattering (SBS) which can generate one or more optical waves when sufficient optical power is coupled to the core of the fiber optic element. The Brillouin threshold in high-finesse fiber optical resonator cavities can be as low as a few tens of microwatts. One embodiment of this invention utilizes the Brillouin phenomenon in a high-finesse fiber cavity to generate four or more counter-rotating waves in the fiber from which the rotation angle can be determined through the observation of the scattered light at the side of the fiber optic element.

Gain can be induced in a high-finesse fiber ring resonator by exciting the ring with sufficient power from a continuous-wave, narrow line width laser source. The counter-rotating waves are generated through the non-linear optical process SBS. SBS occurs in the optical fibers when the optical field becomes sufficiently strong. This occurs when the laser frequency is tuned to the resonance of the fiber optic loop. The initial optical field is scattered by an acoustic wave that occurs naturally in the fiber and can be thought of as a traveling index grating. The backscattered light from the acoustic wave experiences a frequency shift, like a Doppler shift, from the original optical field because the acoustic waves are moving. The scattered light mixes with the original laser light to produce its own acoustic wave through electrostriction effects. This in turn scatters more light from the original laser beam. More scattered light leads to more acoustic waves and the process progresses to produce more frequency-shifted Brillouin light waves from the original laser source. If the laser source is tuned to the resonance of a fiber cavity, the optical field builds up and the nonlinear process of SBS induces a gain at the Brillouin frequency. When the gain at the Brillouin shifted light frequency has exceeded the loss of the cavity, laser action occurs at the Brillouin frequency. The Brillouin laser action occurs in the opposite direction to the original laser source because it was generated by a backscattered portion of the scattered radiation. The frequency shift of the new laser line is given by the expression $f=2Vn/\lambda$, where $V$ is the velocity of sound in the fiber, typically 6 km/s, $n$ is the index of refraction, typically 1.5, and $\lambda$ is the wavelength of the original laser light.

For a laser light of 1.3 microns the Brillouin frequency is about 13.8 GHz. The threshold for the Brillouin laser action can be in the tens of microwatts for high-finesse fiber cavities. If the power in the Brillouin laser line becomes high enough then it can produce a Brillouin shifted laser of its own. This is called the second Brillouin laser line, which is traveling in the opposite direction to the first Brillouin, and its frequency is shifted down by another 13.8 GHz. This process can go on as long as there is power available in the original laser. Fourth order laser lines have been produced in resonators of 300 finesse using 1.4 mW of optical power at 1.3 microns. The threshold for the first Brillouin laser was 65 mW and the efficiency was estimated to be approximately 45%.

The scattered light fiber laser using four Brillouin waves can be used to implement a unique fiber optic motion sensor or gyroscope. If a narrow line width laser is tuned to the resonance of a high-finesse cavity and the power is sufficient to generate four Brillouin laser lines, the first and third order Brillouin lines are traveling in the same direction and the second and fourth are traveling in the same direction but opposite to the first and third orders. The first and third Brillouin waves produce a periodic pattern which travels around the fiber loop with the velocity of light in the glass and in the same direction as the original laser beam. The second and fourth Brillouin waves produce a similar periodic pattern which moves around the ring in the opposite direction to the first periodic pattern but in the same direction as the second and fourth Brillouin waves. These periodic patterns are also known as moving fringes. These two moving fringes beat together and in a waveguide that is at rest, the observer, viewing from the side through the scattered light, sees the stationary 1 mm standing wave pattern or stationary fringe. This stationary fringe or standing wave remains fixed with respect to the inertial frame; that is, it is inertially stable. Thus if the waveguide starts to move, the standing wave or stationary fringe will not move with it but will appear to move past an observer who is fixed with respect to the waveguide. The use of simple indicia or a sensor can be used to detect the occurrence of motion, or a plurality of detectors and means to resolve the magnitude and direction of motion can be used to make a more sophisticated gyroscope.

There is shown in FIG. 1 an optical waveguide 10 in the form of a ring which is driven through coupler 12 by light from laser 14 delivered to coupler 12 through fiber optic element 16. The laser light, moving in the direction L through waveguide 10, generates Brillouin wave $B_1$ moving in the opposite direction. Brillouin wave $B_1$ generates a second Brillouin wave $B_2$, which in turn generates a third Brillouin wave $B_3$, which in turn generates a fourth Brillouin wave $B_4$. As indicated, depending upon the power available at laser 14, additional orders of Brillouin waves may be formed. Brillouin waves $B_1$ and $B_3$ mix or beat to form moving fringe $MF_1$. Similarly, Brillouin waves $B_2$-$B_4$ combine to form moving fringe $MF_2$. The two moving fringes combine to form a stationary fringe or a standing wave, SF, in waveguide 10, which is depicted in FIG. 1 as a tiger tail effect: that is, a series of dark and light bands or fringes 18 and 20, respectively, of approximately 1 mm width.

Figure 2:
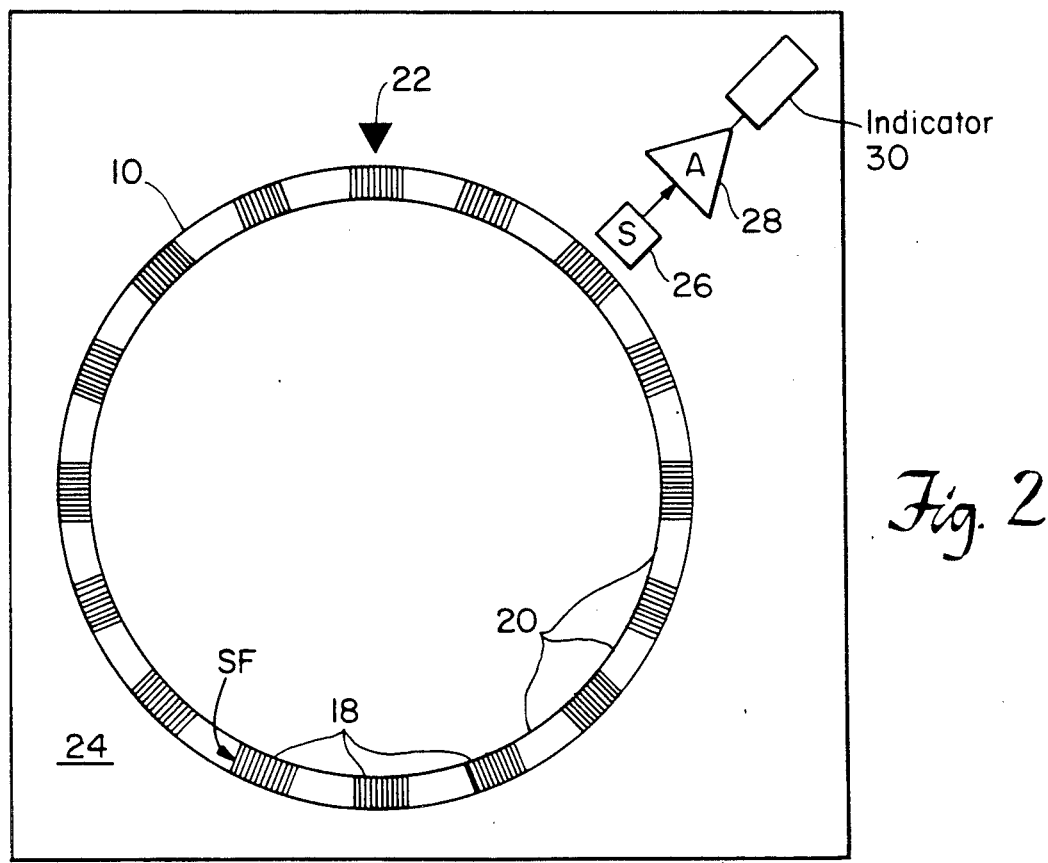
FIG. 2 is a schematic diagram of an optical waveguide with both an indicia and a sensor to indicate relative motion between the standing fringe and the waveguide.
Figure 3:
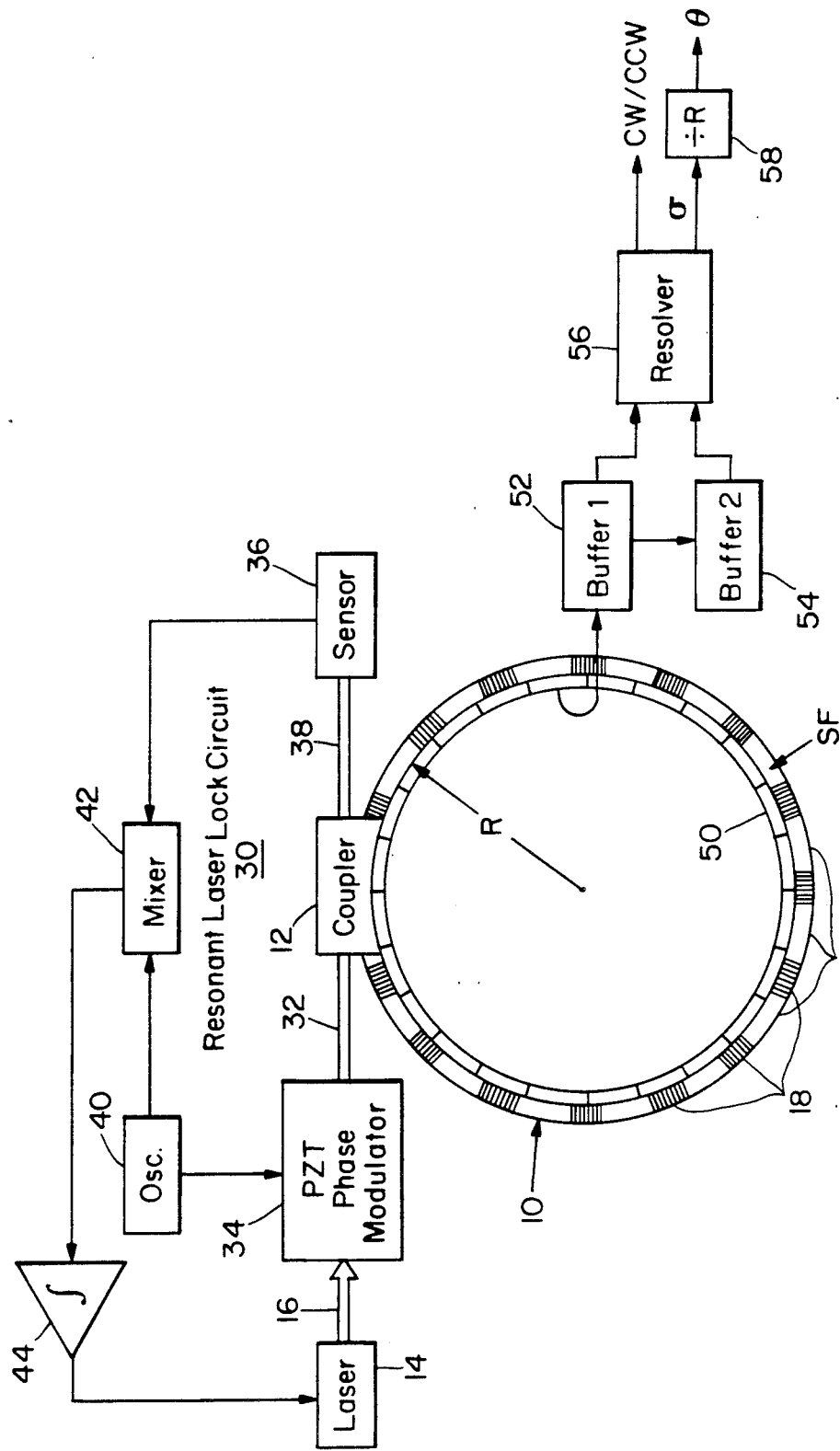
FIG. 3 is a more detailed schematic diagram of an optical waveguide with a plurality of sensors and functioning as a gyroscope according to this invention.

Such a device can be used as a simple motion sensor, as shown in FIG. 2, when it is disposed proximate an index mark 22. Thus any movement of ring 10 or the platform 24 on which it may be fixed will show a relative motion between it and the inertially stationary fringe SF. Alternatively, a light sensor 26 may be used to sense any change in the incident scattered light which will be noted when the stationary fringe SF moves, causing the dark and light fringes 18 and 20 to move with respect to sensor 26. The signal from sensor 26 may be amplified in sensor 28 and used to drive some sort of indicator 30.

A more traditional gyroscope system may be constructed according to this invention in which a resonant laser lock circuit 30 is used to lock the laser frequency to the resonant frequency of waveguide 10.

Resonant laser lock circuit 30 includes a piezoelectric phase modulator 34 which modulates the frequency of the light beam on fiber optic element 16 from laser 14 and provides a beam of adjusted frequency or wavelength on fiber optic element 32 connected to coupler 12. A sensor 36 senses a light at coupler 12 to another fiber optic element 38. The frequency or wavelength of the light sensed by sensor 36 is beat in mixer 42 with the frequency of oscillator 40, which drives piezoelectric phase modulator 34. Any voltage appearing on the output of mixer 42 is integrated via amplifier 44 and fed to laser 14 to adjust the laser frequency to coincide to fiber resonator cavity 10.

The scattered light output from waveguide 10 can be sensed by a series of sensors 50 such as an array of CCDs which are positioned alongside at least a portion of waveguide 10. The sensors may be sized so that there is more than one sensor per fringe cycle in order to increase resolution. The output from sensors 50 is delivered to a first buffer 52. The contents of buffer 52 are periodically delivered to buffer 54. By comparing the contents of the two buffers, resolver 56, which can be a typical resolver such as a microprocessor chip used with conventional encoders, produces a signal which indicates the direction of relative motion, CW/CCW, of standing wave or stationary fringe SF with respect to sensors 50. Resolver 56 also indicates the magnitude $\sigma$ of the relative motion which when divided by the radius R in divider circuit 58 renders the rotation angle $\theta$.

Figure 4:
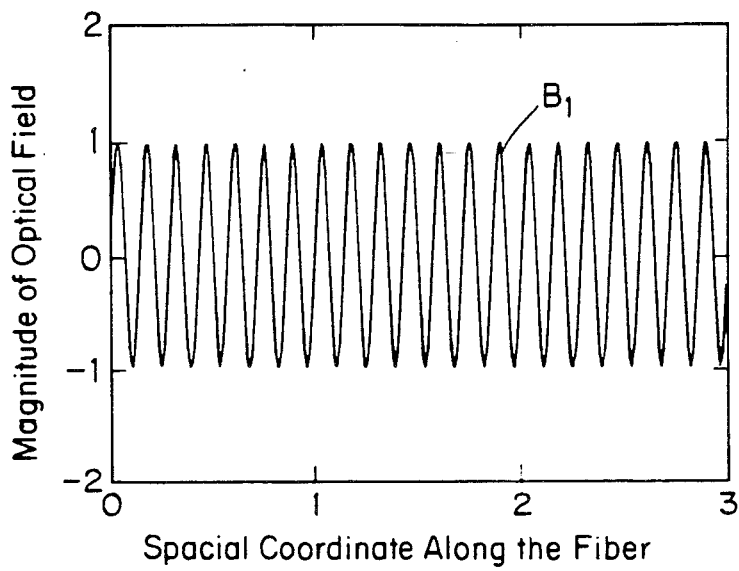
FIGS. 4 and 5 illustrate the waveforms of two Brillouin waves.
Figure 5:
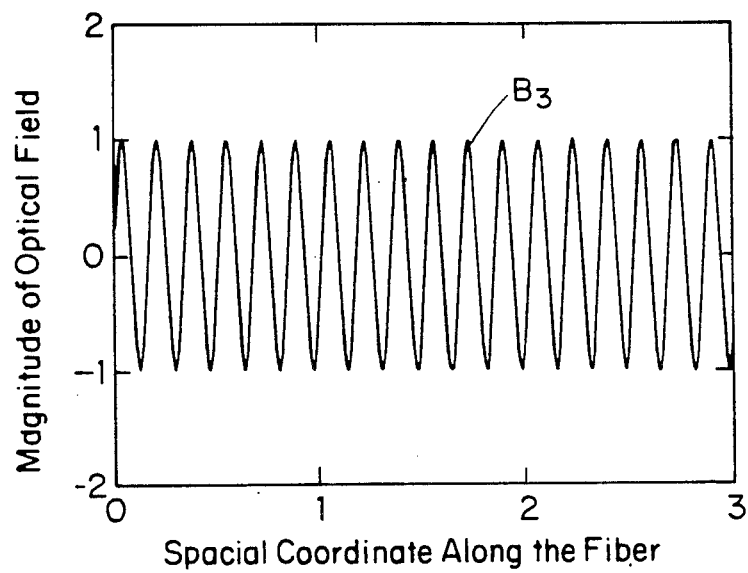
Figure 6:
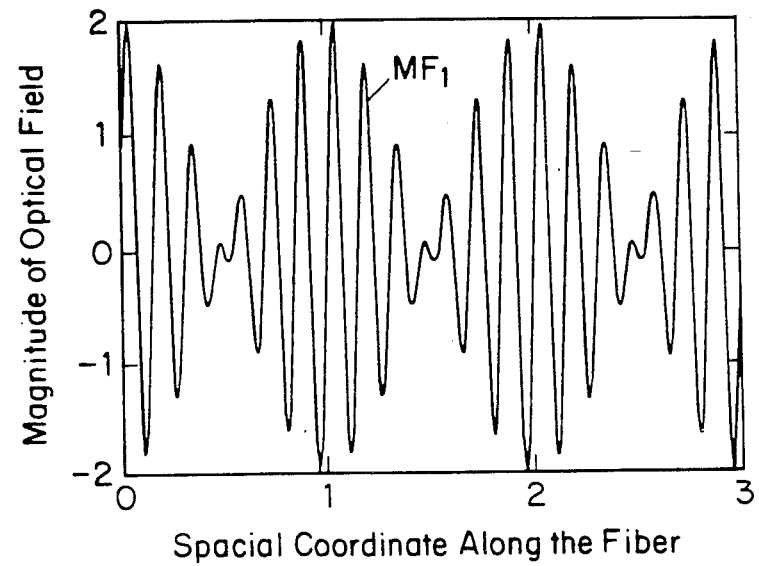
FIG. 6 depicts the waveform of a moving fringe created by the beating of the Brillouin waves of FIGS. 4 and 5.

Typically, laser 14 provides light of 1.3 microns, approximately 200 TerraHz. Waveguide 10 may be 20 meters in length wound on a three-inch spool. The first Brillouin wave $B_1$ occurs at 200 TerraHz less the Brillouin frequency of 13.8 GHz or 199.9862 TerraHz. The second Brillouin wave $B_2$ is down twice the Brillouin frequency, or 27.6 GHz. $B_3$ is down three times the Brillouin frequency or 41.4 GHz, and the fourth Brillouin wave, $B_4$, is down four times the Brillouin wave or 55.2 GHz. The moving fringes $MF_1$ and $MF_2$ occur at twice the Brillouin shift, 27.6 GHz, and the standing wave or stationary fringe has bands of approximately 0.5 to 1 mm. A typical pair of Brillouin waves $B_1$ and $B_3$ are depicted in FIGS. 4 and 5, where the abscissa is designated spatial coordinate along the fiber and the ordinates are designated magnitude of optical field. The beating together of Brillouin waves $B_1$ and $B_3$ produce the moving fringe $MF_1$, FIG. 6, whose envelope oscillates at 27.6 GHz.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A scattered light multi-Brillouin guided wave gyroscope, comprising:
   a coherent light source;
   an optical waveguide, responsive to said coherent light source, for generating a Brillouin inertially stationary, synchronized fringe from two counter-rotating Brillouin moving fringes, each derived from a pair of Brillouin waves separated by twice the Brillouin shift; and
   means, for detecting relative rotation between the Brillouin stationary synchronized fringe and said waveguide.

2. The scattered light multi-Brillouin guided wave optical gyroscope of claim 1 in which said coherent light source is a laser.

3. The scattered light, multi-Brillouin guided wave optical gyroscope of claim 2 in which said laser is a solid state laser.

4. The scattered light, multi-Brillouin guided wave optical gyroscope of claim 1 in which said optical waveguide is a fiber optic element.

5. The scattered light, multi-Brillouin guided wave optical gyroscope of claim 1 in which said means for detecting includes indicia means proximate to and fixed with respect to said waveguide.

6. The scattered light, multi-Brillouin guided wave optical gyroscope of claim 1 in which said means for detecting includes sensor means proximate the side of said waveguide for sensing a shift in said Brillouin stationary fringe relative to said waveguide.

7. The scattered light, multi-Brillouin guided wave optical gyroscope of claim 1 in which said means for detecting includes a plurality of sensors disposed proximate the side of said waveguide for sensing relative motion of said Brillouin stationary fringe.

8. The scattered light, multi-Brillouin guided wave optical gyroscope of claim 7 in which said sensors extend along said waveguide for monitoring a plurality of fringes of the Brillouin stationary fringe.

9. The scattered light, multi-Brillouin guided wave optical gyroscope of claim 8 in which there are a number of sensors disposed adjacent each fringe pattern cycle along said waveguide.

10. The scattered light, multi-Brillouin guided wave optical gyroscope of claim 7 in which said sensors include an array of CCDs.

11. The scattered light, multi-Brillouin guided wave optical gyroscope of claim 1 in which said means for detecting includes means for determining the magnitude of the motion of the Brillouin stationary fringe relative to said waveguide.

12. The scattered light, multi-Brillouin guided wave optical gyroscope of claim 11 in which said means for detecting includes means for determining the direction of relative motion between said waveguide and said Brillouin stationary fringe.

* * * * *